Jan. 15, 1957  W. PANCHESINE  2,777,710
DETACHABLE SPLASH GUARD FOR TRUCKS AND TRAILERS
Filed Feb. 15, 1955
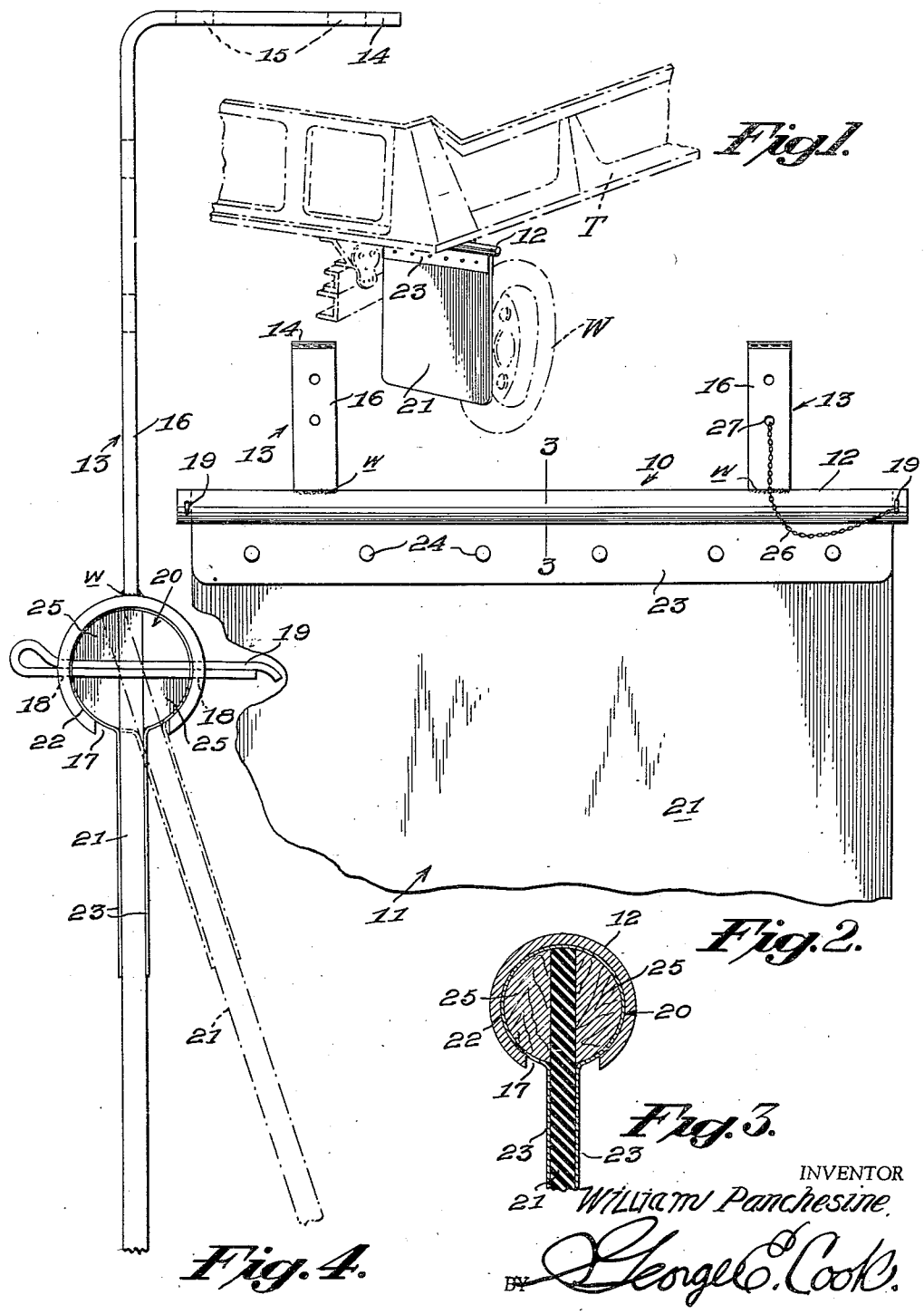
INVENTOR
WILLIAM Panchesine
BY George E. Cook
ATTORNEY

United States Patent Office 2,777,710
Patented Jan. 15, 1957

2,777,710

DETACHABLE SPLASH GUARD FOR TRUCKS AND TRAILERS

William Panchesine, Cape May, N. J.

Application February 15, 1955, Serial No. 488,727

3 Claims. (Cl. 280—154.5)

This invention relates to a splash guard structure for vehicles.

The invention is more particularly concerned with a splash guard structure which is characterized by a bracket for detachable mounting on a truck chassis rearwardly of the rear wheels thereof, and a guard which is removably secured to the bracket.

Heretofore it has generally been the practice to permanently attach splash guards to trucks which proved satisfactory in general use and particularly when the truck was confined to forward movement only.

Such permanently attached guards presented objections however, when the truck was backed over rough terrain, under which conditions the guards in many instances were caught under the rear wheels and ripped off. Furthermore, difficulty with such permanently attached guards has been experienced in dumping operations, where again the guards became caught under the wheels and are broken or ripped off.

It is accordingly a more general object of this invention to provide a splash guard structure having provision of ready removal or attachment of the splash guards or flaps whereby a truck may be properly conditioned for any use to which it may be put in the absence of damage to the guards or flaps.

It has also been found desirable to provide for a limited range of swinging movement for the guard whereby same may readily yield to obstacles which may otherwise damage or ruin the guard.

It is accordingly a further object of the invention to provide a splash guard structure embodying a supporting bracket for removable mounting on a truck chassis and a guard or flap which has a limited swinging movement on an axis transverse to the truck.

Other objects and advantages of the invention will become apparent in the course of the following detailed description, taken in connection with the accompanying drawing, wherein—

Fig. 1 is a prespective view of a portion of a truck shown in dot-and-dash lines and showing the application of the present invention thereto.

Fig. 2 is a fragmentary rear elevational view of the splash guard or mud flap in accordance with a preferred embodiment of the invention.

Fig. 3 is a full scale transverse sectional view in the plane of line 3—3 on Fig. 2.

Fig. 4 is a full scale end elevational view of the structure with the flap per se broken away.

Referring now in detail to the drawing, the invention will be seen to comprise two cooperating members, biz, a support 10 and a guard or flap 11.

The support 10 comprises a tubular member 12 of a length to extend beyond the rear wheels W of a truck T and which is provided with a pair of upwardly projecting brackets 13 including angular foot portions 14 having apertures 15 for receiving bolts by which the support is removably secured to the truck chassis.

The vertical portions 16 of the bracket are preferably diametrically disposed relative to the tubular member 12 and are rigidly secured thereto as by welding w.

The tubular member 12 is provided with a relatively wide slot 17 in its lower side and which extends throughout the entire length of the member. The tubular member is provided with a pair of diametrically opposed apertures 18 adjacent each end thereof for the removable reception of cotter pins 19 for a purpose later set forth.

The guard or flap 11 comprises a cylindrical head 20 and a depending flap 21.

The head 20 comprises a generally tubular portion 22 of a metallic clip which in addition to the tubular portion 22 comprises opposed flange portions 23 between which the upper edge portion of the flap 21 is disposed and extends to the very top inside portion of the clip and is secured therein by rivets 24 extending through the flanges and the flap.

The flap 21 is disposed diametrically of the tubular portion 22 and extends completely through same, as indicated in Figs. 3 and 4. The clip tubular portion 22 is rendered solid by a wood segment 25 disposed therein at each side of the flap 21.

The tubular portion 22 freely fits within the metallic tubular member 12 and is inserted therein or withdrawn therefrom upon axial movement of the tubular portion. Furthermore the tubular portion 22 is of slightly less length than that of the tubular member 12, as indicated in Fig. 2, whereby it is removably retained in position by a cotter pin 19 inserted into the aligned apertures 18 adjacent each end of the tubular member 12.

The flap may be removed from or inserted into either end of the tubular member 12 and each cotter pin may have one end of a chain or other flexible member 26 attached thereto and the other end thereof secured within an aperture 27 in an adjacent bracket 13, whereby the cotter pins will not become misplaced or lost.

As is indicated in Fig. 4, the width of the slot 17 is such that the guards or flaps 21 have a substantial range of free swinging about the axis of a tubular member 12 which avoids damage particularly as may occur by abrupt bending of the flap 21 adjacent the free edges of the flanges 23.

It is to be noted that by this construction all movable parts are metal to metal thereby providing wear resisting qualities.

Having set forth my invention in accordance with a preferred structural embodiment thereof, what I claim and desire to secure by U. S. Letters Patent is:

1. A splash guard structure for use with a vehicle comprising a support adapted for removable mounting on the chassis of said vehicle behind a rear wheel thereof, said support comprising a tubular member having a relatively wide slot in its lower portion and extending throughout the length thereof, a guard member including a cylindrical head portion axially slidable within said tubular member, and a flap portion depending from the head portion and extending through said slot, said slot being substantially wider than the thickness of said flap, and said cylindrical head portion being rotatable about its axis within said tubular member for oscillation of said flap through a range limited by the edges of said slot.

2. The structure according to claim 1, wherein said head portion is of less length than said tubular member, and said tubular member having a pair of diametrically opposed apertures therein adjacent each end thereof for removable reception of a cotter pin, said cotter pins spanning the ends of said head portion for removable retention of same within said tubular member.

3. The structure according to claim 1, wherein said cylindrical head portion comprises an upper edge portion of said flap, a segmental filler member disposed on each side of said flap portion, said filler members and the upper edge of said flap presenting an outer cylindrical surface, a metallic tubular portion surrounding said cylindrical surface, and opposed parallel flanges projecting from said tubular portion and engaging said flap and secured thereto.

References Cited in the file of this patent

UNITED STATES PATENTS

| | | |
|---|---|---|
| 2,640,714 | Garner | June 2, 1953 |
| 2,683,612 | Bacino | July 13, 1954 |

FOREIGN PATENTS

| | | |
|---|---|---|
| 496,078 | Canada | Sept. 15, 1953 |
| 22,564 of 1935 | Australia | May 9, 1935 |